United States Patent
Oyama

(10) Patent No.: US 7,752,399 B2
(45) Date of Patent: Jul. 6, 2010

(54) EXCLUSION CONTROL METHOD AND INFORMATION PROCESSING APPARATUS

(75) Inventor: Hiroaki Oyama, Tokyo (JP)

(73) Assignee: NEC Corporation (JP)

( * ) Notice: Subject to any disclaimer, the term of this patent is extended or adjusted under 35 U.S.C. 154(b) by 245 days.

(21) Appl. No.: 11/388,860

(22) Filed: Mar. 24, 2006

(65) Prior Publication Data
US 2006/0224949 A1 Oct. 5, 2006

(30) Foreign Application Priority Data
Mar. 30, 2005 (JP) .............................. 2005-099576

(51) Int. Cl.
*G06F 12/00* (2006.01)
(52) U.S. Cl. ................... 711/150; 711/152; 711/161; 711/162; 711/E12.038; 711/E12.044
(58) Field of Classification Search .................. None
See application file for complete search history.

(56) References Cited

U.S. PATENT DOCUMENTS

| | | | | |
|---|---|---|---|---|
| 4,805,106 A | * | 2/1989 | Pfeifer | 710/200 |
| 6,823,511 B1 | * | 11/2004 | McKenney et al. | 718/102 |
| 6,988,112 B2 | | 1/2006 | Kikuchi | 707/202 |
| 2001/0049714 A1 | * | 12/2001 | Kikuchi | 709/201 |
| 2005/0086656 A1 | * | 4/2005 | Whitlock et al. | 718/1 |

FOREIGN PATENT DOCUMENTS

| | | |
|---|---|---|
| JP | 2001-344142 | 12/2001 |
| JP | 2002-132565 | 5/2002 |

* cited by examiner

*Primary Examiner*—Reginald G Bragdon
*Assistant Examiner*—Shawn X Gu
(74) *Attorney, Agent, or Firm*—Hayes Soloway P.C.

(57) ABSTRACT

Disclosed is an information processing apparatus that has an update procedure semaphore, and a generation management information as management information of a shared data area that requires exclusion control. The generation management information specifies one item of generation information of the shared data area. As generation information provided for every generation, the apparatus has a reference-count measuring counter, a semaphore for updating generation information, a pointer for pointing to old generation information, and a pointer for pointing to the substance of the shared data area. In a case where the latest shared data is updated, a duplicate of the latest shared data area is created, new generation information corresponding to the duplicated shared data area is generated, data in the duplicated shared data area is updated and generation information, which corresponds to the shared data area after the updating thereof, is registered as the latest generation information.

16 Claims, 6 Drawing Sheets

EXCLUSION CONTROL METHOD AND INFORMATION PROCESSING APPARATUS

FIELD OF THE INVENTION

This invention relates to an information processing apparatus and, more particularly, to an exclusion control method and apparatus.

BACKGROUND OF THE INVENTION

In the accessing of a shared resource from a plurality of processes, exclusion control is unnecessary if access is solely referential access but exclusion control does become necessary if there is even a single update access. For example, often there are circumstances where shared data that is constantly referred to is updated frequently. In order for the exclusion control mechanism to maintain consistency of shared data, there is a possibility that reference and update will be made to wait until the respective acquisition requests are allowed.

Exclusion control referred to as "read-write lock" offers an improvement that makes simultaneous reference possible. In cases where updating is involved, however, access is always made to wait until the processing that is in progress is completed. As a consequence, response time often is not uniform. With such read/write-lock exclusion control, a plurality of lock acquisition requests are allowed simultaneously when reference is had to a resource. When an update is made, however, only a single acquisition request is allowed, even to a process making reference. For this reason, even though an attempt may be made to perform reference while lock is in progress at update time, lock acquisition is not allowed and reference is made to wait until the lock prevailing at update time is released.

Further, even in cases where update is attempted, lock acquisition is not allowed and all referencing processes (processes that perform referential access) are made to wait until the lock is released.

When updating of some kind is performed, therefore, not only processes on the update side but also processes on the reference side are always made to wait for lock acquisition and situations in which processing falls behind arise. This makes it difficult to achieve more efficient, high-speed processing.

Patent Document 1 discloses a database exclusion control system that shortens the time required for exclusion of update and reference even with a database that does not possess a synonym function. Specifically, master records are stored in a master table together with generation starting numbers and generation end numbers assigned thereto, and valid generation numbers of master records to which reference is currently possible are stored in a generation management table. In a case where a master record is incorporated in the master table anew, the generation starting number of the master record is made larger than the valid generation numbers and the master record is incorporated. If reference to the master table is subsequently excluded and processing ends normally, then the valid generation number of this master record is updated to a number greater than the generation starting numbers and exclusion is released. Patent Document 2 discloses an arrangement in which a file is subjected to exclusion control block by block. During rollback of updating performed thus far, a block held temporarily in holding means, which temporarily holds a block prevailing prior to update and corresponding to a block currently being updated by a program, is used to make possible reference and update from another program to a block that is to be subjected to the rollback. Reference and updating of a block to undergo rollback can be performed preferentially without waiting for the end thereof and it is possible to raise the processing efficiency of programs when one file is referred to and updated simultaneously by a plurality of programs.

[Patent Document 1]
  Japanese Patent Kokai Publication No. JP-P2002-132565A

[Patent Document 2]
  Japanese Patent Kokai Publication No. JP-P2001-344142A

SUMMARY OF THE DISCLOSURE

Accordingly, it is an object of the present invention to provide an exclusion control method, apparatus and program that make it possible to shorten response time required for updating even during execution of reference.

Another object of the present invention is to provide an exclusion control method, apparatus and program that make it possible to shorten response time required for reference even during execution of updating.

The above and other objects are attained, in accordance with one aspect of the present invention, by providing an exclusion control method in an information processor having a shared data area that requires exclusion control, comprising independently providing a shared data area for update separate from one for reference with regard to the shared data area that requires exclusion control; arranging it so that reference during updating will not be obstructed; and performing generation management with regard to the shared data area that requires exclusion control.

The above and other objects are attained, in accordance with another aspect of the present invention, by providing an information processing apparatus having exclusion control processing means for executing exclusion control of a shared data area that requires exclusion control, comprising means for providing a shared data area for update separate from one for reference with regard to the shared data area that requires exclusion control, thereby arranging it so that reference during updating will not be obstructed; and means for performing generation management with regard to the shared data area that requires exclusion control.

The present invention is such that in a case where the latest shared data is to be updated, the information processor creates a duplicate of the latest shared data area, generates new generation information corresponding to the duplicated shared data area, updates data in the duplicated shared data area and registers generation information, which corresponds to the shared data area after the updating thereof, as the latest generation information.

According to the present invention, the information processing apparatus has an update-procedure semaphore, which is necessary for exclusion control, and generation management information, which is for managing old and new generations of the shared data area, as management information of the shared data area that requires exclusion control; wherein the generation management information specifies, as the generation management information, one item of generation information of shared data provided on a per-generation basis, and the generation information has a pointer to the shared data area.

According to the present invention, the information processing apparatus may have the following as the generation information provided for every generation: a reference-count measuring counter for measuring reference count; a semaphore for updating generation information; a pointer for pointing to preceding generation information; and a pointer for pointing to the substance of the shared data area.

According to the present invention, the method may have the following as a procedure for acquiring reference lock of the shared data area: acquiring lock of an update semaphore of generation information that will be the latest generation information; incrementing a reference-count measuring counter of the generation information; acquiring a pointer that points to the shared data area of the generation information; and releasing lock of the update semaphore of the generation information; wherein it is made possible for a process that has acquired the reference lock of the shared data area to continue referring to the acquired shared data area for a necessary period of time.

According to the present invention, the method may have the following as a procedure for releasing reference lock of the shared data area: acquiring lock of an update semaphore of generation information corresponding to an area to undergo release; decrementing the reference-count measuring counter of the generation information; storing true/false of result of judgment that the value in the reference-count measuring counter is zero and that the shared data area that is to undergo release is not the latest; releasing the lock of the update semaphore of generation information corresponding to the shared data area to undergo release; deleting the shared data area, which is to undergo lock release, and the generation information corresponding to this area if the result of judgment is true, and exiting if the result of judgment is false; and releasing the lock of the shared data area acquired for reference.

According to the present invention, the information processing apparatus may have the following as a procedure for updating the shared data area: acquiring a lock of the update procedure semaphore; acquiring the latest shared data area by the procedure for acquiring the reference lock; creating a duplicate of the shared data area and generating generation information corresponding thereto; updating the data in the duplicated shared data area; registering generation information, which corresponds to the shared data area after the updating thereof, as the latest generation information; releasing the reference state of an old-generation shared data area by the procedure for releasing the reference lock; releasing the lock of the update procedure semaphore; and making it possible to update the shared data area using the latest data of the shared data area.

According to another aspect of the present invention, the foregoing objects are attained by providing a program stored on a computer-readable medium, the program causing a computer, which implements exclusion control of a shared data area that requires exclusion control, to execute the following processing: processing for providing a shared data area for update separate from one for reference with regard to the shared data area; and processing for performing generation management with regard to the shared data area that requires exclusion control.

The computer program according to the present invention is such that the computer is further caused to execute the following processing: in a case where the latest shared data is updated, processing for creating a duplicate of the latest shared data area and generating new generation information corresponding to the duplicated shared data area; and processing for updating data in the duplicated shared data area and registering generation information, which corresponds to the shared data area after the updating thereof, as the latest generation information.

The meritorious effects of the present invention are summarized as follows.

In accordance with the present invention, it is possible to shorten response time required for updating, without a delay imposed by exclusion control, even during execution of reference.

Further, in accordance with the present invention, reference processing can be started without waiting for completion of update processing even during execution of update processing. As a result, response time required for reference can be shortened.

Other features and advantages of the present invention will be apparent from the following description taken in conjunction with the accompanying drawings, in which like reference characters designate the same or similar parts throughout the figures thereof.

PREFERRED EMBODIMENTS OF THE INVENTION

Figure 1:
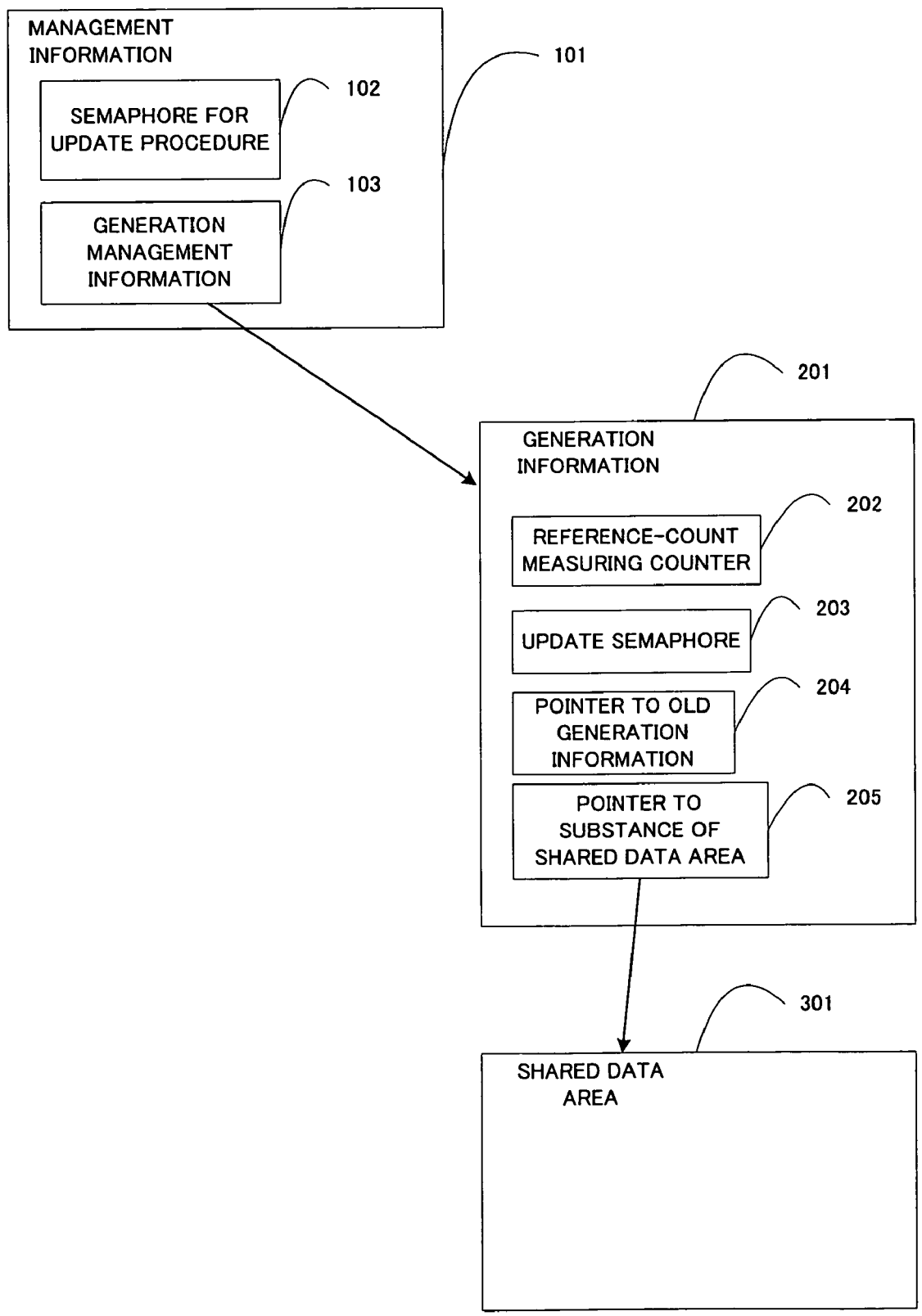
FIGS. 1 to 3 are diagrams useful in describing an embodiment of the present invention.

A preferred embodiment of the present invention will now be described in detail with reference to the accompanying drawings. The basic principles of the present invention will be described first.

The basic principles of the present invention are as follows:
 with regard to a shared data area requiring exclusion control, a shared data area for update is also prepared separately and independently from one for reference, and it is so arranged that reference during updating will not be obstructed; and
 with regard to a shared data area requiring exclusion control, generation management is performed and it is so arranged that more areas than necessary are not provided.

Information prepared in order to perform exclusion control in this embodiment for the purpose of implementing the invention will now be described.

The following items are necessary as management information, these being units of management of data required by exclusion control:

(A1) a semaphore for an update procedure; and (A2) information for managing old and new generations of a shared data area.

The semaphore for the update procedure is management information necessary for exclusion control.

The information for managing old and new generations of a shared data area is the shared data itself in the prior art. In the present invention, however, management is performed by splitting the information into a semaphore and shared data in order to implement generation management. More specifically, information for managing old and new generations of a shared data area is a pointer to generation information.

It should be noted that a semaphore, which is generally used to allow mutual exclusion of a resource, is a data structure for performing control so that an interval, in which preserving order is sought, will not be executed simultaneously by a plurality of processes. A process that is capable of acquiring a lock at the same time is a single process. In order for another process to acquire a new lock while this single process is currently in lock acquisition, the other process must wait until the currently acquired lock is released.

Further, in this embodiment of the present invention, it is preferred that the information set forth below be available as management information that accompanies the shared data per se.

The following items are required as generation information necessary for every generation:

(B1) a counter for measuring reference count;
(B2) an update semaphore for the present generation information;
(B3) a pointer that points to old generation information; and
(B4) a pointer that points to the substance of the shared data area.

Among these, it is assumed that the counter for measuring reference count takes on a value of zero in a case where a process that has acquired a lock does not exist. Data that requires exclusion control is managed using these items of information.

In the present invention, with regard to reference, it is possible to execute a plurality of references simultaneously. However, the number of simultaneous executions in updating is made one.

In an embodiment of the present invention, lock acquisition procedures are two in number, namely for reference and for update, and the user of the information processing apparatus uses these selectively in accordance with the purpose of lock acquisition.

The lock acquisition procedure for reference is as follows (see FIG. 4):

Step S11: Acquire the lock of the update semaphore of the latest generation information.

Step S12: Increment the reference-count measuring counter of the same generation information.

Step S13: Acquire the pointer that points to the shared data area of the same generation information.

Step S14: Release lock of the update semaphore of the same generation information.

By virtue of this procedure, the acquired shared data area can continue to be referred to for the necessary period of time.

A procedure for releasing reference lock is as follows (see FIG. 5):

Step S21: Acquire the update semaphore of generation information that corresponds to an area that is to undergo release.

Step S22: Decrement the reference-count measuring counter of the same generation information.

Step S23: The following statement is judged and the result of the judgment is stored in a storage unit (not shown): "The result of processing at step S22 is that the count in the reference-count measuring counter is zero and the shared data area that is to undergo release is not the latest".

Step S24: Release the lock of the update semaphore of the generation information that corresponds to the shared data area that is to undergo release.

Step S25: Do nothing and terminate if result of the judgment at step S23 is false.

If the result of judgment at step S23 is true, proceed to step S26 and delete the shared data area, which is to undergo lock release, and the generation information corresponding thereto.

By virtue of this procedure, lock of a shared data area acquired for reference can be released.

Figure 6:
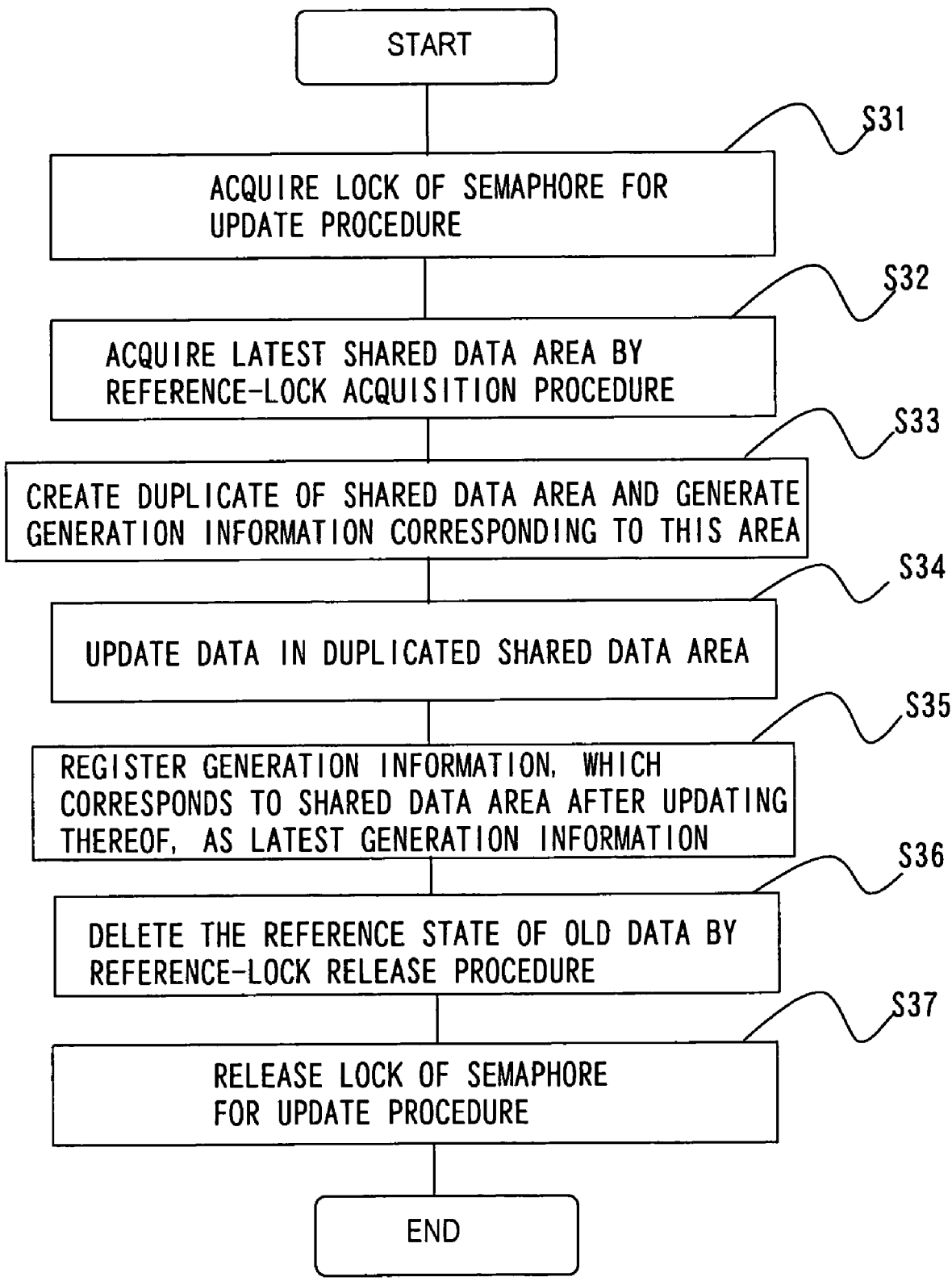
FIG. 6 is a flowchart illustrating an example of an update procedure according to the present invention.

The update procedure according to the present invention is as follows (see FIG. 6).

Step S31: Acquire lock of the semaphore for update procedure.

Step S32: Acquire the latest shared data area by the above-described reference-lock acquisition procedure (steps S11 to S14 in FIG. 4).

Step S33: Create a duplicate of the shared data area and generate generation information corresponding to this area.

Step S34: Update the data in the duplicated shared data area.

Step S35: Register generation information, which corresponds to the shared data area after the updating thereof, as the latest generation information.

Step S36: Delete the reference state of the old data by the above-described reference-lock release procedure (steps S21 to S26 in FIG. 5).

Step S37: Release lock of semaphore for update procedure.

Figure 4:
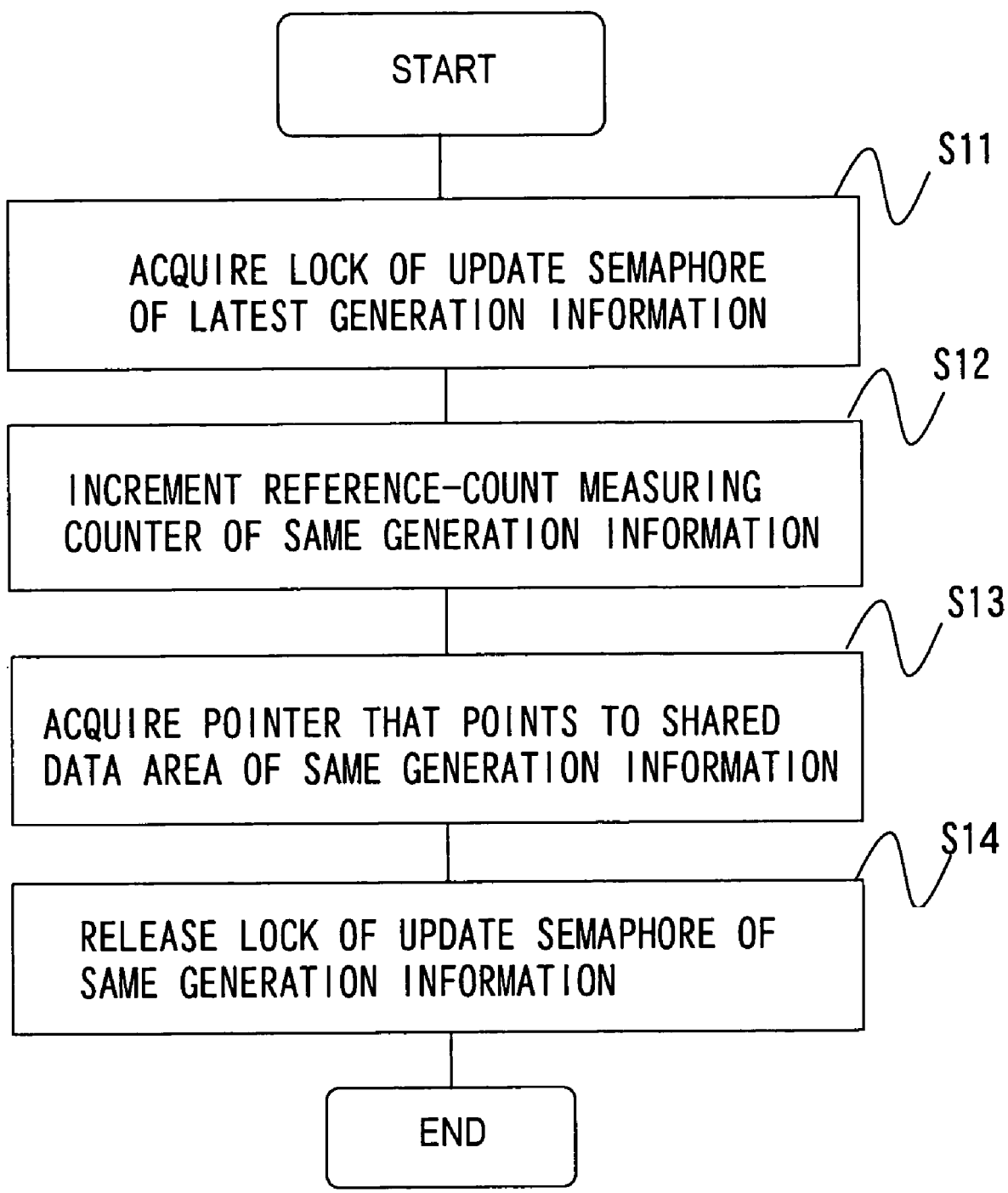
FIG. 4 is a flowchart illustrating an example of a reference-lock acquisition procedure according to the present invention.
Figure 5:
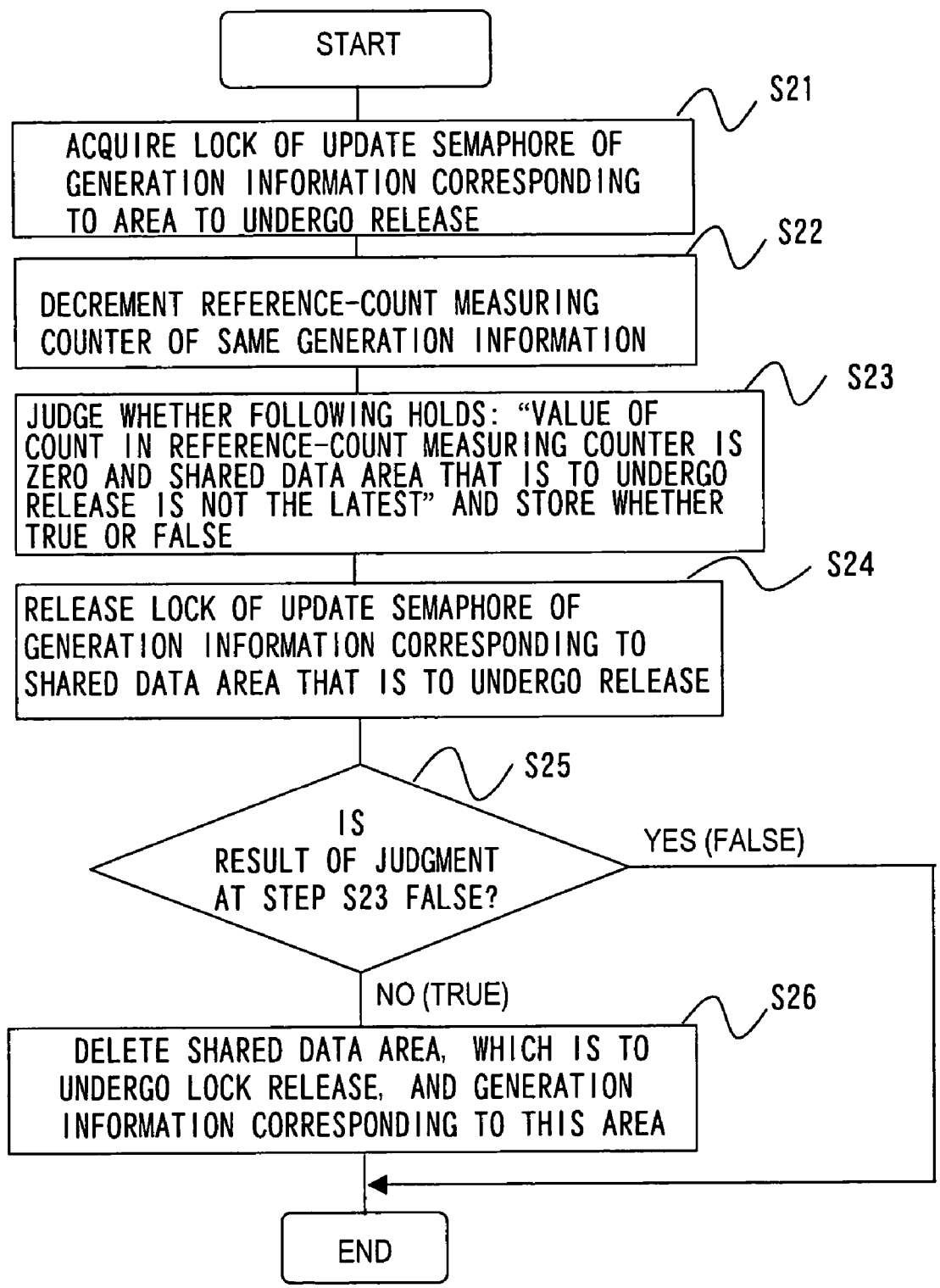
FIG. 5 is a flowchart illustrating an example of a reference-lock release procedure according to the present invention.

By virtue of this procedure, a shared data area can be updated using the latest data of the shared data area. It should be noted that the processing procedures shown in FIGS. 4 to 6 are executed by programs run by an information processing apparatus (not shown). The present invention will now be described in accordance with an embodiment thereof.

FIG. 1 is a diagram illustrating the initial state of related information of exclusion control means in an information processing apparatus according to this embodiment. FIG. 1 shows the principal components of the exclusion control means. These are capable of being mounted in an existing information processing apparatus. A CPU and memory, etc., of the information processing apparatus are not illustrated.

Management information 101 and generation information 201 are provided as information for management purposes. Also provided are a semaphore 102 for an update procedure and information 103 for generation management. The generation information 201 includes a reference-count measuring counter 202, an update semaphore 203, a pointer 204 to old generation information and a pointer 205 to the substance of the shared data area.

In this embodiment, reference can be had to the shared data area by a plurality of processes simultaneously, but the number of simultaneous executions in updating is one only.

It will be assumed as an initial state that a process that has acquired a lock does not exist. That is, the initial state is as follows:

The semaphore 102 for the update procedure has not been acquired.
The information 103 for generation management points to the generation information 201.
The reference-count measuring counter 202 indicates a value of zero.
The update semaphore 203 has not been acquired.
The pointer 204 to old generation information does not have an object to which it points.
The pointer 205 to the substance of the shared data area points to a shared data area 301.

Lock acquisition and release in this embodiment will be described in a case where the sequence thereof is as follows:

Step 1: reference-lock acquisition (1)
Step 2: reference-lock acquisition (2)
Step 3: update lock
Step 4: reference-lock acquisition (3)
Step 5: reference-lock release (2)
Step 6: reference-lock release (1)
Step 7: reference-lock release (3)

It should be noted that the numbers in the parentheses represent that the lock acquisition and release correspond to each other. For example, reference-lock release (1) corresponds to reference-lock acquisition (1).

At reference-lock release (1) of step 1, updating of the generation information 201 is performed. That is, incrementing of the reference-count measuring counter 202 and return of the pointer 205 that points to the shared data area 301 are carried out in accordance with the procedure for acquiring the reference lock.

Next, at reference-lock acquisition performed at step 2, updating of the generation information 201 is performed. That is, incrementing of the reference-count measuring counter 202 and return of the pointer 205 that points to the shared data area 301 are carried out similarly in accordance with the procedure for acquiring the reference lock.

Next, at update lock performed at step 3, creation of a shared data area 311 (see FIG. 2) and generation information 211 (see FIG. 2) and updating of the management information 101 are carried out in accordance with the update procedure.

Figure 2:
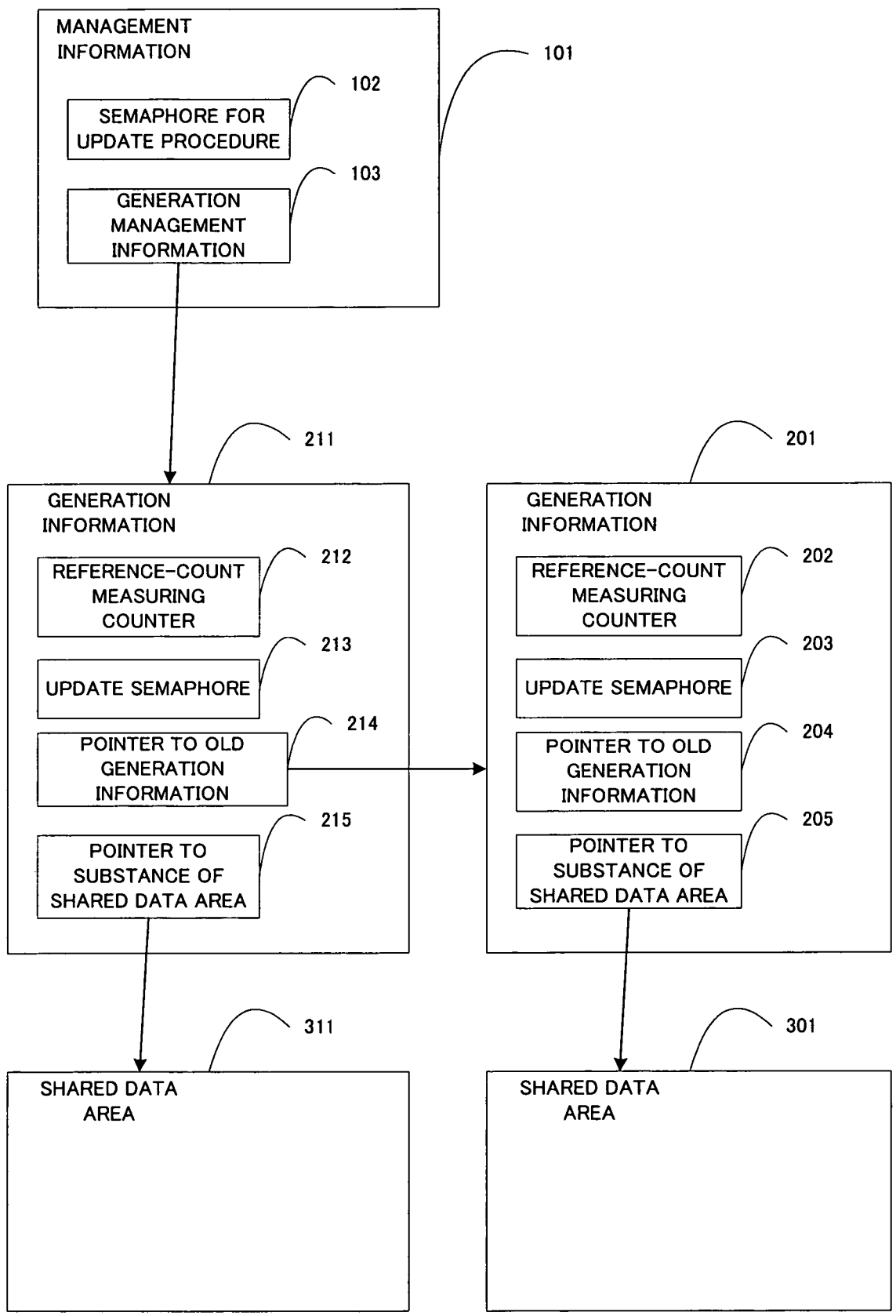

At this point in time the state is replaced by the state shown in FIG. 2. That is, the pointer 214 to the old generation information is set again so as to point to the generation information 201 in such a manner that the information 103 for generation management will point to the latest generation information 211.

Next, at reference-lock acquisition (3) performed at step 4, updating of the latest generation information 211 is performed. That is, incrementing of the reference-count measuring counter 212 and return of the pointer 215 that points to the shared data area 311 are carried out in accordance with the procedure for acquiring the reference lock.

Next, at reference-lock release (2) performed at step 5, release of the lock acquired at step 2 is carried out.

Updating of the generation information 201, namely decrementing of the reference-count measuring counter 202, is performed in accordance with the reference-lock release procedure.

At this point in time the value in the reference-count measuring counter 202 is not zero and therefore deletion of the shared data area 301 and generation information 201 is not performed.

Next, at reference-lock release (1) performed at step 6, release of the lock acquired at step 1 is carried out.

Updating of the generation information 201, namely decrementing of the reference-count measuring counter 202, is carried out in accordance with the reference-lock release procedure.

Here deletion of the shared data area 301 and generation information 201 is carried out because the result of decrementing the reference-count measuring counter 202 is that the value of the count is zero, and the generation information 201 is not the latest.

Figure 3:
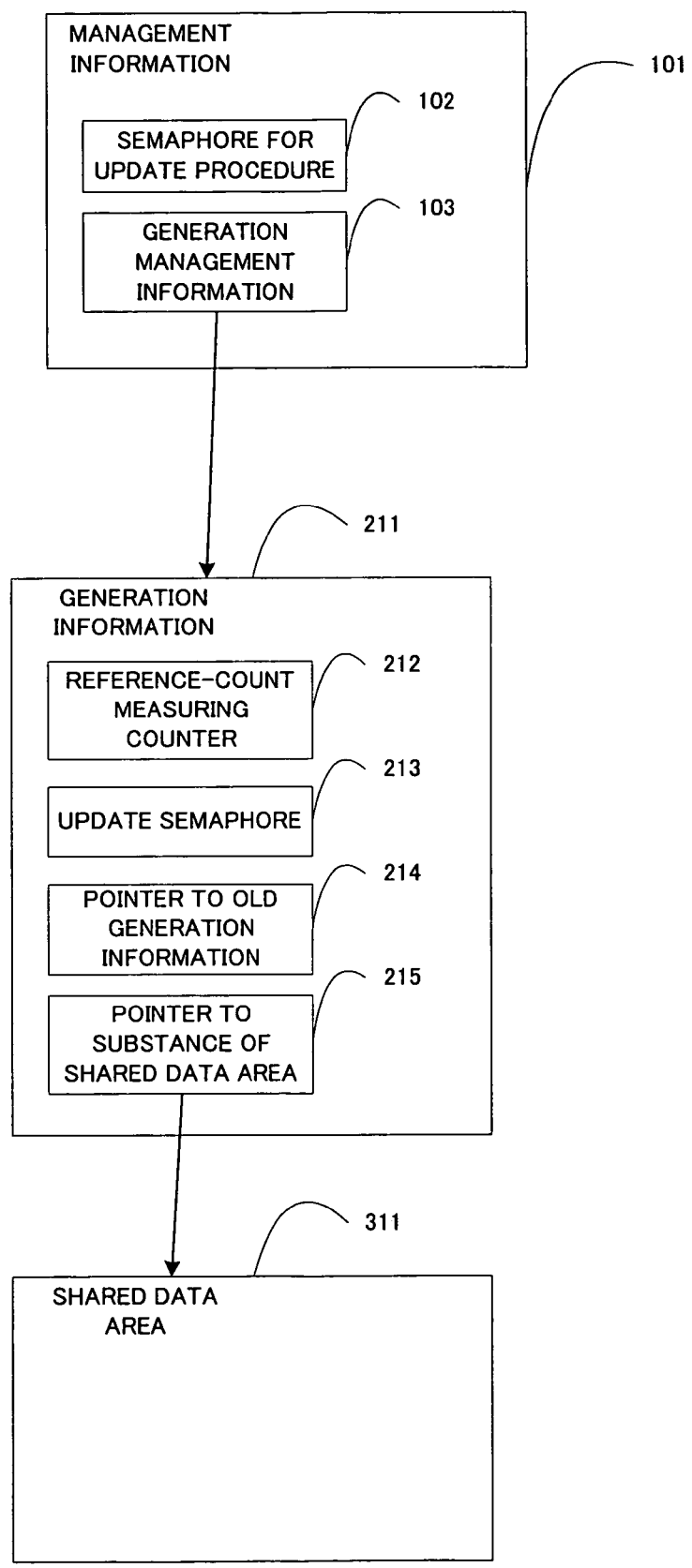

As a result, the state is replaced by that shown in FIG. 3.

Next, at reference-lock release (3) performed at step 7, release of the lock acquired at step 4 is carried out.

Updating of the generation information 211, namely decrementing of the reference-count measuring counter 212, is carried out in accordance with the reference-lock release procedure.

At this point in time the value in the reference-count measuring counter 212 is zero but the generation information 211 is not the latest. Deletion of the shared data area 311 and generation information 211, therefore, is not performed.

As illustrated in this embodiment, update processing can continue without being caused to wait by exclusion control even during execution of reference. This makes it possible to shorten response time required for updating. Conversely, reference processing can be started without waiting for completion of update processing even during execution of update processing. This makes it possible to shorten response time required for reference.

In other words, a response characteristic of the minimum processing can be held at a constant level at all times and this contributes to an improvement in response performance and to stability.

The present invention is applicable when referring to and updating the records in a relational database in which lock is performed line by line of the table. Further, greater effects can be obtained in cases where there are not severe limitations imposed on the order relationship between reference and update.

Though the present invention has been described in accordance with the foregoing embodiments, the invention is not limited to this embodiment and it goes without saying that the invention covers various modifications and changes that would be obvious to those skilled in the art within the scope of the claims.

It should be noted that other objects, features and aspects of the present invention will become apparent in the entire disclosure and that modifications may be done without departing the gist and scope of the present invention as disclosed herein and claimed as appended herewith.

Also it should be noted that any combination of the disclosed and/or claimed elements, matters and/or items may fall under the modifications aforementioned.

What is claimed is:

1. A method for implementing exclusion control in an information processing apparatus having a shared data area that requires exclusion control, said method comprising:

creating, as part of an update procedure, a duplicate of the shared data area for update separate from one for reference with regard to said shared data area; and performing generation management by splitting a quantity of information into a semaphore and the duplicate of the shared data area, with regard to the shared data area that requires exclusion control.

2. The method according to claim 1, further comprising:

in a case where latest shared data is updated in said information processing apparatus, generating new generation information corresponding to the duplicate of the shared data area; and updating data in the duplicate of the shared data area and registering generation information, which corresponds to the shared data area after the updating thereof, as a latest generation information.

3. The method according to claim 1, wherein said information processing apparatus has an update-procedure semaphore, which is necessary for exclusion control, and generation management information, which is for managing old and new generations of the shared data area, as management information of the shared data area that requires exclusion control;

the generation management information specifies one item of generation information of the shared data area provided on a per-generation basis; and the generation information has a pointer to the shared data area.

4. The method according to claim 3, wherein said information processing apparatus has the following as the generation information provided on a per-generation basis:
- a reference-count measuring counter for measuring reference count;
- a semaphore for updating generation information;
- a pointer for pointing to old generation information; and
- a pointer for pointing to at least a substantial portion of the shared data area.

5. The method according to claim 4, including the following steps as a procedure for acquiring reference lock of the shared data area:
- acquiring lock of an update semaphore of latest generation information;
- incrementing a reference-count measuring counter of the generation information;
- acquiring a pointer that points to the shared data area of the generation information; and
- releasing lock of the update semaphore of the generation information;
- wherein it is made possible for a process that has acquired the reference lock of the shared data area to continue referring to the acquired shared data area for a necessary period of time.

6. A method for implementing exclusion control in an information processing apparatus having a shared data area that requires exclusion control, said method comprising:
- creating a duplicate of the shared data area for update separate from one for reference with regard to said shared data area; and
- performing generation management by splitting a quantity of information into a semaphore and the duplicate of the shared data area, with regard to the shared data area that requires exclusion control, wherein the information processing apparatus has an update procedure semaphore and generation management information provided on a per-generation basis;
- acquiring reference lock of the shared data area; and
- releasing reference lock of the shared data area, comprising the steps of:
- acquiring lock of an update semaphore of generation information corresponding to an area to undergo release;
- decrementing a reference-count measuring counter of the generation information;
- storing true/false regarding result of judgment that a value in said reference-count measuring counter is zero and, moreover, that the shared data area that is to undergo release is not the latest;
- releasing the lock of the update semaphore of generation information corresponding to the shared data area to undergo release;
- deleting the shared data area, which is to undergo lock release, and the generation information corresponding to this area if the result of judgment is true, and exiting if the result of judgment is false; and
- releasing the reference lock of the shared data area.

7. A method for implementing exclusion control in an information processing apparatus having a shared data area that requires exclusion control, said method comprising:
- creating a duplicate of the shared data area for update separate from one for reference with regard to said shared data area;
- performing generation management by splitting a quantity of information into a semaphore and the duplicate of the shared data area, with regard to the shared data area that requires exclusion control; and
- updating at least a portion of the shared data area on a per-generation basis, wherein the information processing apparatus has an update procedure semaphore and the updating at least a portion of the shared data area comprises the steps of:
- acquiring a lock of the update procedure semaphore;
- acquiring a latest shared data area by a procedure for acquiring a reference lock;
- creating the duplicate of the shared data area and generating generation information corresponding to the created duplicate of the shared data area;
- updating the data in the duplicate of the shared data area;
- registering generation information, which corresponds to the shared data area after the updating thereof, as the latest generation information;
- releasing a reference state of an old-generation shared data area by a procedure for releasing the reference lock;
- releasing the lock of the update procedure semaphore; and
- making it possible to update the shared data area using the latest data of the shared data area.

8. An information processing apparatus comprising a computer having computer readable program code disposed therein, said computer readable computer code comprising a series of computer readable program steps for executing exclusion control of a shared data area that requires exclusion control, comprising:
- creating, as part of an update procedure, a duplicate of the shared data area for update separate from one for reference with regard to the shared data area; and
- performing generation management by splitting a quantity of information into a semaphore and the duplicate of the shared data area, with regard to the shared data area that requires exclusion control.

9. The information processing apparatus according to claim 8, further comprising:
- generating new generation information corresponding to the duplicate of the shared data area; and
- updating data in the duplicate of the shared data area and registering generation information, which corresponds to the shared data area after the updating thereof, as a latest generation information.

10. The information processing apparatus according to claim 8, wherein said information processing apparatus has an update-procedure semaphore, which is necessary for exclusion control, and generation management information, which is for managing old and new generations of the shared data area, as management information of the shared data area that requires exclusion control;
- the generation management information specifies one item of generation information of the shared data area provided on a per-generation basis; and
- the generation information has a pointer to the shared data area.

11. The information processing apparatus according to claim 10, wherein said apparatus includes the following as the generation information provided on a per-generation basis:
- a reference-count measuring counter for measuring reference count;
- a semaphore for updating generation information;
- a pointer for pointing to old generation information; and
- a pointer for pointing to at least a substantial portion of the shared data area.

12. The information processing apparatus according to claim 11, wherein said apparatus executes the following as a procedure for acquiring reference lock of the shared data area:
- acquiring lock of an update semaphore of latest generation information;

incrementing a reference-count measuring counter of the generation information;
acquiring a pointer that points to the shared data area of the generation information; and
releasing lock of the update semaphore of the generation information; wherein it is made possible for a process that has acquired the reference lock of the shared data area to continue referring to the acquired shared data area for a necessary period of time.

13. An information processing apparatus comprising a computer having computer readable program code disposed therein, said computer readable computer code comprising a series of computer readable program steps for executing exclusion control of a shared data area that requires exclusion control, comprising:
    creating a duplicate of the shared data area for update separate from one for reference with regard to the shared data area; and
    performing generation management by splitting a quantity of information into a semaphore and the duplicate of the shared data area, with regard to the shared data area that requires exclusion control, wherein the semaphore comprises an update procedure semaphore and the information processing apparatus has generation management information provided on a per-generation basis;
    acquiring reference lock of the shared data area; and
    releasing reference lock of the shared data area, comprising:
    acquiring lock of an update semaphore of generation information corresponding to an area to undergo release;
    decrementing a reference-count measuring counter of the generation information;
    storing true/false regarding result of judgment that a value in said reference-count measuring counter is zero and, moreover, that the shared data area that is to undergo release is not the latest;
    releasing the lock of the update semaphore of generation information corresponding to the shared data area to undergo release;
    deleting the shared data area, which is to undergo lock release, and the generation information corresponding to this area if the result of judgment is true, and exiting if the result of judgment is false; and
    releasing the reference lock of the shared data area.

14. An information processing apparatus comprising a computer having computer readable program code disposed therein, said computer readable computer code comprising a series of computer readable program steps for executing exclusion control of a shared data area that requires exclusion control, comprising:
    creating a duplicate of the shared data area for update separate from one for reference with regard to the shared data area; and
    performing generation management by splitting a quantity of information into a semaphore and the duplicate of the shared data area, with regard to the shared data area that requires exclusion control; and
    updating at least a portion of the shared data area on a per-generation basis, wherein the semaphore comprises an update-procedure semaphore and the updating at least a portion of the shared data area comprises:
    acquiring a lock of the update procedure semaphore;
    acquiring a latest shared data area by a procedure for acquiring a reference lock;
    creating the duplicate of the shared data area and generating generation information corresponding to the created duplicate of the shared data area;
    updating the data in the duplicate of the shared data area;
    registering generation information, which corresponds to the shared data area after the updating thereof, as the latest generation information;
    releasing a reference state of an old-generation shared data area by a procedure for releasing the reference lock;
    releasing the lock of the update procedure semaphore; and
    when a process updates the shared data area, making update possible using the latest data of the shared data area.

15. A computer program embodied in computer readable media for causing a computer to implement exclusion control of a shared data area that requires exclusion control, to execute the following processing:
    creating, as part of an update procedure, a duplicate of the shared data area for update separate from one for reference with regard to the shared data area; and
    processing for performing generation management by splitting a quantity of information into a semaphore and the duplicate of the shared data area with regard to the shared data area that requires exclusion control.

16. The program according to claim 15, wherein the computer is further caused to execute the following processing:
    in a case where latest shared data is updated generating new generation information corresponding to the duplicate of the shared data area; and
    processing for updating data in the duplicated shared data area and registering generation information, which corresponds to the shared data area after the updating thereof, as a latest generation information.

* * * * *